(12) United States Patent
Kawachiya et al.

(10) Patent No.: US 8,938,728 B2
(45) Date of Patent: *Jan. 20, 2015

(54) DYNAMIC COMPILER PROGRAM, DYNAMIC COMPILING METHOD AND DYNAMIC COMPILING DEVICE

(71) Applicant: International Business Machines Corporation, Armonk, NY (US)

(72) Inventors: Kiyokuni Kawachiya, Kanagawa-ken (JP); Kazunori Ogata, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/096,700

(22) Filed: Dec. 4, 2013

(65) Prior Publication Data

US 2014/0149971 A1 May 29, 2014

Related U.S. Application Data

(63) Continuation of application No. 13/076,853, filed on Mar. 31, 2011, now Pat. No. 8,612,948.

(30) Foreign Application Priority Data

Apr. 5, 2010 (JP) ................... 2010-087038

(51) Int. Cl.
  *G06F 9/45* (2006.01)
  *G06F 9/455* (2006.01)
(52) U.S. Cl.
  CPC .......... *G06F 9/45516* (2013.01); *G06F 8/4441* (2013.01)
  USPC ............................ 717/148; 717/151; 717/140

(58) Field of Classification Search
  None
  See application file for complete search history.

(56) References Cited

U.S. PATENT DOCUMENTS

| 7,316,010 B1 | 1/2008 | Daynes et al. |
| 7,665,075 B1 | 2/2010 | Daynes et al. |

(Continued)

FOREIGN PATENT DOCUMENTS

| JP | 2002259135 A | 9/2002 |
| JP | 2003140909 A | 5/2003 |
| JP | 2005215884 A | 8/2005 |

OTHER PUBLICATIONS

Suganuma et al., "A Dynamic Optimization Framework for a Java just-in-time Compiler", Proceedings of the ACM SIG-PLAN Conf. on Object-Oriented . . . , pp. 180-194, Oct. 2001.

(Continued)

*Primary Examiner* — Insun Kang
(74) *Attorney, Agent, or Firm* — Scully, Scott, Murphy & Presser, P.C.; Jennifer R. Davis, Esq.

(57) ABSTRACT

A dynamic compiler program product, method, and device for sequentially compiling a partial computer program in a computer. The program product causes the computer to: acquire respective values of one or more pieces of current execution status information; read, from the shared pool, a list of the conditions associated with an executable instruction stream generated by compiling a partial program that is the same as a partial program to be compiled, and determine whether respective values of corresponding pieces of current execution status information satisfy the conditions. The program product causes the computer to further generate an executable instruction stream by compiling the partial program to be compiled on the condition that a result of determination made is negative.

12 Claims, 7 Drawing Sheets

(56) References Cited

U.S. PATENT DOCUMENTS

| | | |
|---|---|---|
| 8,176,480 B1 * | 5/2012 | Spertus .................... 717/158 |
| 8,321,850 B2 | 11/2012 | Bruening et al. |
| 2004/0019886 A1 * | 1/2004 | Berent et al. ................ 717/158 |
| 2005/0102657 A1 | 5/2005 | Lewis |
| 2005/0177821 A1 | 8/2005 | Ogata et al. |
| 2006/0048114 A1 * | 3/2006 | Schmidt .................... 717/148 |
| 2006/0101441 A1 * | 5/2006 | Fulton et al. ................ 717/158 |
| 2007/0204260 A1 * | 8/2007 | Ishizuka .................... 717/162 |
| 2007/0226698 A1 * | 9/2007 | Cascaval et al. ............ 717/127 |
| 2007/0294665 A1 | 12/2007 | Papakipos et al. |
| 2008/0127120 A1 * | 5/2008 | Kosche et al. ............... 717/131 |
| 2008/0184210 A1 | 7/2008 | Lee et al. |
| 2008/0235674 A1 | 9/2008 | Gao et al. |
| 2010/0313189 A1 | 12/2010 | Beretta et al. |

OTHER PUBLICATIONS

Pilkington et al., "Enhance performance with class sharing", Sep. 30, 2008, developerWorks Japan, http://www.ibm.com/developerworks/java/library/j-sharedclasses/.

* cited by examiner

| CATEGORY | EXECUTION STATUS INFORMATION | SPECIFIC EXEMPLARY CONDITIONS THAT CORRESPONDING PIECES OF EXECUTION STATUS INFORMATION NEED TO SATISFY |
|---|---|---|
| METHOD TO BE COMPILED | BYTECODE AND CLASS METADATA (BOTH INCLUDE INFORMATION ON METHODS INLINED DURING COMPILATION) | 1. TIME CLASS FILE WAS CHANGED IS SAME AS OR PRECEDES TIME STORED JIT GENERATED CODE WAS CREATED<br><br>2. C1.foo() AND C2.bar() CAN BE SET AS METHODS TO BE COMPILED BY INLINING C1.foo() AND C2.bar() |
| SYSTEM CONFIGURATION INFORMATION | CONFIGURATION OF HARDWARE AND SOFTWARE | 3. NUMBER OF CPUS IN MACHINE IS TWO OR MORE<br><br>4. VERSION OF JVM IS Java 6 |
| | COMMAND LINE ARGUMENT AND ENVIRONMENT VARIABLE | 5. -Xaggressive IS SPECIFIED AS COMMAND LINE ARGUMENT |
| INTERNAL INFORMATION OF VIRTUAL MACHINE | LIST OF CLASSES HAVING BEEN INITIALIZED OUT OF CLASSES REFERRED TO IN COMPILATION | 6. java.util.ArrayList CLASS HAS BEEN INITIALIZED OUT OF CLASSES REFERRED TO IN COMPILATION |
| | ADDRESS OF EXECUTABLE INSTRUCTION STREAM OF ANOTHER METHOD | 7. ADDRESS OF EXECUTABLE INSTRUCTION STREAM IS LOCATED WITHIN 32 KB FROM GENERATED ADDRESS OF METHOD THAT IS CURRENTLY BEING COMPILED |
| | INFORMATION STORED WHEN JIT COMPILER COMPILED ANOTHER METHOD FOR OPTIMIZING METHOD | 8. INFORMATION SHOWING THAT VALUE RECEIVED AS ARGUMENT IS NOT STORED INTO GLOBAL VARIABLE IS RECORDED IN INFORMATION STORED BY JIT COMPILER REGARDING ANOTHER METHOD CALLED FROM METHOD THAT IS BEING COMPILED |
| | CLASS HIERARCHY INFORMATION OF LOADED CLASSES | 9. IN LOADED CLASSES, METHOD foo() IN CLASS C IS NOT OVERRIDDEN WITH SUBCLASS |
| | STATUS OF EXTERNAL REFERENCE RESOLUTION | 10. EXTERNAL REFERENCE TO CLASS C REFERRED TO FROM METHOD THAT IS BEING JIT-COMPILED HAS BEEN RESOLVED |
| EXECUTION PROFILE | RESULT OF EXECUTION PROFILE | 11. PROBABILITY THAT VALUE OF ARGUMENT OF METHOD foo() IS ZERO IS EQUAL TO OR MORE THAN 75% |
| | OPTIMIZATION LEVEL | 12. REQUESTED COMPILATION LEVEL IS "warm" |

DYNAMIC COMPILER PROGRAM, DYNAMIC COMPILING METHOD AND DYNAMIC COMPILING DEVICE

CROSS-REFERENCE TO RELATED APPLICATIONS

This application is a continuation of and claims priority to U.S. patent application Ser. No. 13/076,853, filed Mar. 31, 2011 now U.S. Pat. No. 8,612,948, the entire contents of which are incorporated by reference herein.

BACKGROUND OF THE INVENTION

1. Field of the Invention

The present invention relates to dynamic compiler programs, dynamic compiling methods, and dynamic compiling devices. More particularly, the present invention relates to a dynamic compiler program, a dynamic compiling method, and a dynamic compiling device for reusing a compiled partial program having undergone adaptive optimization.

2. Description of the Related Art

Recently, dynamic compilers such as just-in-time (JIT) compilers have been used in, for example, environments for executing Java® programs. In the middle of execution of a program such as a Java® application, when a part of the program having not been compiled needs to be executed, a dynamic compiler compiles a partial program that is the part of the program to be executed. In this arrangement, while a delay in starting up a program in a case where the whole program is first compiled is prevented, execution of the program can be performed rapidly as compared with interpreter execution.

In order to execute a program more rapidly, when compiling a partial program, a dynamic compiler acquires execution status information that is the status information of an environment for executing a program and generates a compiled executable instruction stream by performing optimization to adapt to the status of an execution environment indicated by the execution status information. Execution status information referred to by a dynamic compiler for optimization includes, for example, information on whether a class has been loaded and profile data at the time of executing a program. Such optimization is called adaptive optimization (refer to Suganuma, et al., "A Dynamic Optimization Framework for a Java just-in-time Compiler", In Proceedings of the ACM SIG-PLAN Conference on Object-Oriented Programming, Systems, Languages & Applications, pp. 180-194, October 2001).

An executable instruction stream generated by a dynamic compiler such as a JIT compiler compiling a partial program in the aforementioned manner is available while a compiled process is operating. Thus, a dynamic compiler compiles the partial program every time the same Java program is executed. Such a situation occurs, for example, when the same Java program is executed multiple times in the same machine or when a plurality of guest virtual machines execute the same Java program in a virtualization environment.

Hitherto, a technique for enabling, by storing ahead-of-time (AOT) code compiled by AOT compilation in a permanent cache, sharing of the compiled AOT code among Java® virtual machines has been disclosed as a technique for avoiding duplicate compilation of a partial program included in a Java program (refer to Pilkington, et al., "Enhance performance with class sharing," Sep. 30, 2008, developerWorks Japan).

Moreover, a technique is disclosed in which a virtual machine includes a code cache as a storage area with a limited capacity for native code and a JIT compiler that compiles byte code to native code that can be executed directly by the virtual machine in execution of the byte code, stores the native code in the code cache, and then executes the native code. The virtual machine further includes a search table for searching for information used to determine whether compilation has been done and the address of the compiled native code on the basis of the address of the byte code (refer to Japanese Patent No. 3808755 [JP2003140909]).

In Pilkington, the AOT code stored in the permanent cache is a native code variant of a Java® method generated by AOT compilation. Unlike JIT compilation, AOT compilation does not adopt adaptive optimization adapted to the result of dynamic analysis of a Java method that is being executed. Thus, although the time necessary for compilation is reduced by sharing of the AOT code, the execution speed of the shared AOT code is low.

On the other hand, in Japanese Patent No. 3808755, the native code stored in the code cache is generated by JIT compilation. However, Japanese Patent No. 3808755 does not describe optimization, including adaptive optimization, for improving the execution speed of a program, and the native code stored in the code cache is native code having not undergone optimization. Thus, as is the case with the technique in Pilkington, the execution speed of the native code to be reused in Japanese Patent No. 3808755 is low.

Accordingly, duplicate compilation of a partial program included in a Java program needs to be avoided, and the program needs to be executed rapidly. However, even in a case where an executable instruction stream generated by the application of adaptive optimization is simply stored in a cache as shared code, since optimization is performed to adapt to the status of an execution environment indicated by the value of current execution status information in adaptive optimization, as described above, when the value of current execution status information differs from the value of execution status information at the time of reuse, the availability of the shared code is unknown, and eventually, the shared code cannot be used. In this regard, JP2005215884 describes that, when compilation has been performed so as to be optimized to a status different from the status of the current execution environment, it is determined that recompilation is necessary, and recompilation is performed.

However, in an arrangement in which, only in a case where the value of execution status information at the time of compilation is the same as the value of execution status information at the time of reuse, a compiled executable instruction stream is used, as shown in JP2005215884, the reusability is low, and thus, advantageous effects achieved by the reuse of compiled code can seldom be expected.

In this case, a method (specialization) for specializing a part of a program to processing performed when a variable referred to by the program takes a specific value is proposed as a method for optimization. For example, a method for determining, regarding each method in a program, whether the value of a variable takes a predetermined value every time the method is called and performing processing by branching to a specialized instruction stream or a non-specialized instruction stream in a manner that depends on the determination result is proposed (refer to JP2002259135). Thus, the aforementioned problem is solved by using specialization as a method for optimization. However, the problem of reuse of native code generated by the application of adaptive optimization is still unsolved.

SUMMARY OF THE INVENTION

According to an aspect of the present invention, a dynamic compiler program product is provided for sequentially compiling a partial program in a computer. The program product causes the computer to function as: an execution status acquisition unit for acquiring respective values of one or more pieces of current execution status information; a determination unit for reading, from the shared pool, the second list of the conditions associated with an executable instruction stream generated by compiling a partial program that is the same as a partial program to be compiled and determining whether respective values of corresponding pieces of current execution status information satisfy the conditions; and a dynamic compilation unit for generating an executable instruction stream by compiling the partial program to be compiled on the condition that a result of determination made by the determination unit is negative. The dynamic compiler program product causes the computer to reuse the executable instruction stream stored in the shared pool in association with the second list of the conditions on the condition that the determination made by the determination unit is positive.

According to another aspect of the present invention, a dynamic compiling method is provided for sequentially compiling a partial program in a computer. The method includes: acquiring respective values of one or more pieces of current execution status information; reading, from the shared pool, the second list of the conditions associated with an executable instruction stream generated by compiling a partial program that is the same as a partial program to be compiled and determining whether respective values of corresponding pieces of current execution status information satisfy the conditions; and generating an executable instruction stream by compiling the partial program to be compiled on the condition that a result of determination is negative. The executable instruction stream stored in the shared pool in association with the second list of the conditions is reused on the condition that the determination is positive.

According to a further aspect of the present invention, a dynamic compiling device is provided for sequentially compiling a partial program in a computer. The device includes: a shared pool for storing, in each of one or more partial computer programs in a computer program executed by a computer, an executable instruction stream generated by compiling the partial program in association with a first list of pieces of execution status information, where the status information is of an execution environment referred to in each of one or more types of optimization applied to the partial program and a second list of conditions that respective values of the corresponding pieces of execution status information in the first list need to satisfy to achieve an effect of corresponding optimization; an execution status acquisition unit for acquiring respective values of one or more pieces of current execution status information; a determination unit for reading, from the shared pool, the second list of the conditions associated with an executable instruction stream generated by compiling a partial program that is the same as a partial program to be compiled and determining whether respective values of corresponding pieces of current execution status information satisfy the conditions; and a dynamic compilation unit for generating an executable instruction stream by compiling the partial program to be compiled on the condition that a result of the determination is negative. The executable instruction stream stored in the shared pool in association with the second list of the conditions is reused on the condition that the determination is positive.

BRIEF DESCRIPTION OF THE DRAWINGS

FIG. 3 shows an exemplary list of pieces of execution status information and conditions that the corresponding pieces of execution status information need to satisfy according to an embodiment of the present invention.

DETAILED DESCRIPTION OF THE PREFERRED EMBODIMENTS

Embodiments of the present invention will now be described in detail on the basis of the drawings. However, the following embodiments do not restrict the invention claimed in the claims. Moreover, all combinations of features described in the embodiments are not necessarily mandatory for the problem-solving means of the present invention. The same numbers are assigned to the same components throughout the description of the embodiments of the present invention.

Embodiments of the present invention provide a technique for efficiently reusing a compiled executable instruction stream generated by the application of adaptive optimization. The embodiments of the present invention avoids duplicate compilation of a partial program included in a Java program and execute the program rapidly by providing such a technique.

The conditions for reusing an executable instruction stream generated by applying adaptive optimization are described herein. Adaptive optimization generates an executable instruction stream to adapt to the status of an execution environment at the time of optimization. However, not all types of adaptive optimization are inapplicable when the respective values of pieces of execution status information at the time of reuse slightly differ from the respective values of pieces of execution status information at the time of optimization. That is, in some adaptive optimization types, an executable instruction stream generated by the application of the optimization is made available on the condition that the respective values of pieces of execution status information at the time of use fall within a predetermined range. Thus, embodiments of the present invention include storing a compiled executable instruction stream in association with a list of pieces of execution status information referred to in applied optimization and conditions that the respective values of the pieces of execution status information in the list need to satisfy to achieve the effect of the applied optimization so as to be able to verify, at the time of reuse, that the respective values of pieces of execution status information at the time of reuse fall within the predetermined range.

That is, in the embodiments of the present invention, in a computer executing a dynamic compiler program for sequentially compiling a partial program to be executed, out of a plurality of partial programs included in a program, during execution of the program, a part of a memory of the computer or a storage unit accessible from the computer is set as a shared pool, and an executable instruction stream generated by compiling the partial program is stored in the shred pool in association with a first list of pieces of execution status information that is the status information of an execution environment referred to in each of the one or more types of optimization applied to the partial program and a second list of conditions that the respective values of the corresponding pieces of execution status information in the first list need to satisfy to achieve the effect of corresponding optimization. Then, when the respective values of one or more pieces of current execution status information regarding a partial program to be executed next have been acquired, it is determined whether a compiled executable instruction stream exists in the shared pool, the executable instruction stream corresponding to the partial program to be executed next, the respective values of one or more pieces of current execution status information satisfying corresponding conditions in a list associated with the executable instruction stream. When a compiled executable instruction stream in which the conditions are satisfied exists, the compiled executable instruction stream is reused. When a compiled executable instruction stream in which the conditions are satisfied does not exist, an executable instruction stream is generated by compiling the partial program to be executed next.

In other words, the embodiments of the present invention for achieving the aforementioned objects is implemented via a following dynamic compiler program, executed on the aforementioned computer system, for causing the computer to sequentially compile a partial program to be executed, out of a plurality of partial programs included in a program. The dynamic compiler program causes the computer to function as an execution status acquisition unit acquiring respective values of one or more pieces of current execution status information, a determination unit reading, from the shared pool, the second list of the conditions associated with an executable instruction stream generated by compiling a partial program that is the same as a partial program to be compiled and determining whether respective values of corresponding pieces of current execution status information satisfy the conditions, and a dynamic compilation unit generating an executable instruction stream by compiling the partial program to be compiled on the condition that determination made by the determination unit is negative. The dynamic compiler program reuses the executable instruction stream stored in the shared pool in association with the second list of the conditions on the condition that the result of the determination made by the determination unit is positive. In this case, a partial program can be, for example, a method, a function, or a basic block in a program.

Preferably, the dynamic compilation unit generates an executable instruction stream by compiling the partial program to be compiled by application of optimization an effect of which is determined as being achieved referring to the respective values of the one or more pieces of current execution status information, out of one or more types of optimization applicable to the partial program to be compiled, and the dynamic compiler program further causes the computer to function as a condition and executable instruction stream recording unit recording, to the shared pool, the executable instruction stream generated by the dynamic compilation unit in association with the first list of the pieces of execution status information referred to in each of the one or more types of optimization applied to the partial program and the second list of the conditions, which the corresponding pieces of execution status information need to satisfy, used to determine that an effect of corresponding optimization is achieved regarding the pieces of execution status information in the first list.

More preferably, on the condition that all of the one or more types of optimization applied to the partial program refer to pieces of execution status information respective values of which slightly differ from corresponding values in another compiling device that can access the shared pool or pieces of execution status information respective values of which slightly change every time the execution status acquisition unit acquires the pieces of execution status information, the condition and executable instruction stream recording unit records, to the shared pool, the executable instruction stream generated by the dynamic compilation unit in association with the first list of the pieces of execution status information referred to in each of the types of optimization and the second list of the conditions, which the corresponding pieces of execution status information need to satisfy, used to determine that the effect of the optimization is achieved regarding the pieces of execution status information in the first list. Alternatively, the condition and executable instruction stream recording unit can record, to the shared pool, on the condition that all of the one or more types of optimization applied to the partial program are low-level optimization, the executable instruction stream generated by the dynamic compilation unit in association with the first list of the pieces of execution status information referred to in each of the types of optimization and the second list of the conditions, which the corresponding pieces of execution status information need to satisfy, used to determine that the effect of the optimization is achieved regarding the pieces of execution status information in the first list.

More preferably, the dynamic compiler program further causes the computer to function as an executable instruction stream recording unit reading, from the shared pool, the executable instruction stream in association with the second list of the conditions and recording the executable instruction stream to a storage area allocated as a work area for the program on a memory of the computer on the condition that the determination made by the determination unit is positive and recording, to the storage area, the executable instruction stream generated by the dynamic compilation unit on the condition that the determination made by the determination unit is negative.

More preferably, when a plurality of executable instruction streams exist in the shared pool, the executable instruction streams corresponding to the partial program to be compiled and each being associated with the second list of the conditions, which the respective values of the corresponding one or more pieces of current execution status information can satisfy, the determination unit determines an executable instruction stream with the maximum number of conditions in the second list of the conditions as being the executable instruction stream to be reused.

More preferably, the number of conditions is calculated using weighting values predetermined for each type of optimization.

More preferably, when a plurality of executable instruction streams exist in the shared pool, the executable instruction streams corresponding to the partial program to be compiled and each being associated with the second list of the conditions, which the respective values of the corresponding one or more pieces of current execution status information can satisfy, the determination unit determines an executable instruction stream, the number of types of optimization applied to the executable instruction stream being largest, as being the executable instruction stream to be reused.

More preferably, the number of types of optimization is calculated using weighting values predetermined for each type of optimization.

More preferably, when the executable instruction stream generated by the dynamic compilation unit includes an address as an operand, the condition and executable instruction stream recording unit records, to the shared pool, the executable instruction stream in association with, in addition, the information of the location of the address in the executable instruction stream and identification information for identifying data pointed to by the address.

The embodiments of the present invention has been described as a dynamic compiler program for causing a computer to sequentially compile a partial program to be executed, out of a plurality of partial programs included in a program, during execution of the program. Moreover, the embodiments of the present invention can be viewed as a dynamic compiling method performed in a computer in which the dynamic compiler program is installed. Moreover, the embodiments of the present invention can be viewed as a dynamic compiling device performing the dynamic compiling method, with the dynamic compiler program being installed in the dynamic compiling device.

In the embodiments of the present invention, in a shared pool storing an executable instruction stream generated by compiling a partial program for the purpose of reuse, a first list of pieces of execution status information referred to in each the one or more types of optimization applied to the partial program and a second list of conditions that the respective values of the corresponding pieces of execution status information in the first list need to satisfy to achieve the effect of corresponding optimization are stored in association with the executable instruction stream. Thus, when the reuse of a compiled executable instruction stream is examined, whether the respective values of pieces of current execution status information satisfy the corresponding conditions in the second list associated with the executable instruction stream to be examined can be determined, resulting in an improvement in the availability of an executable instruction stream generated by the application of adaptive optimization. Moreover, since an executable instruction stream generated by the application of adaptive optimization can be efficiently reused, duplicate compilation of a partial program included in a Java program can be avoided, and the program can be executed rapidly. The other advantageous effects of the present invention will be appreciated from the description of an embodiment.

Figure 1:
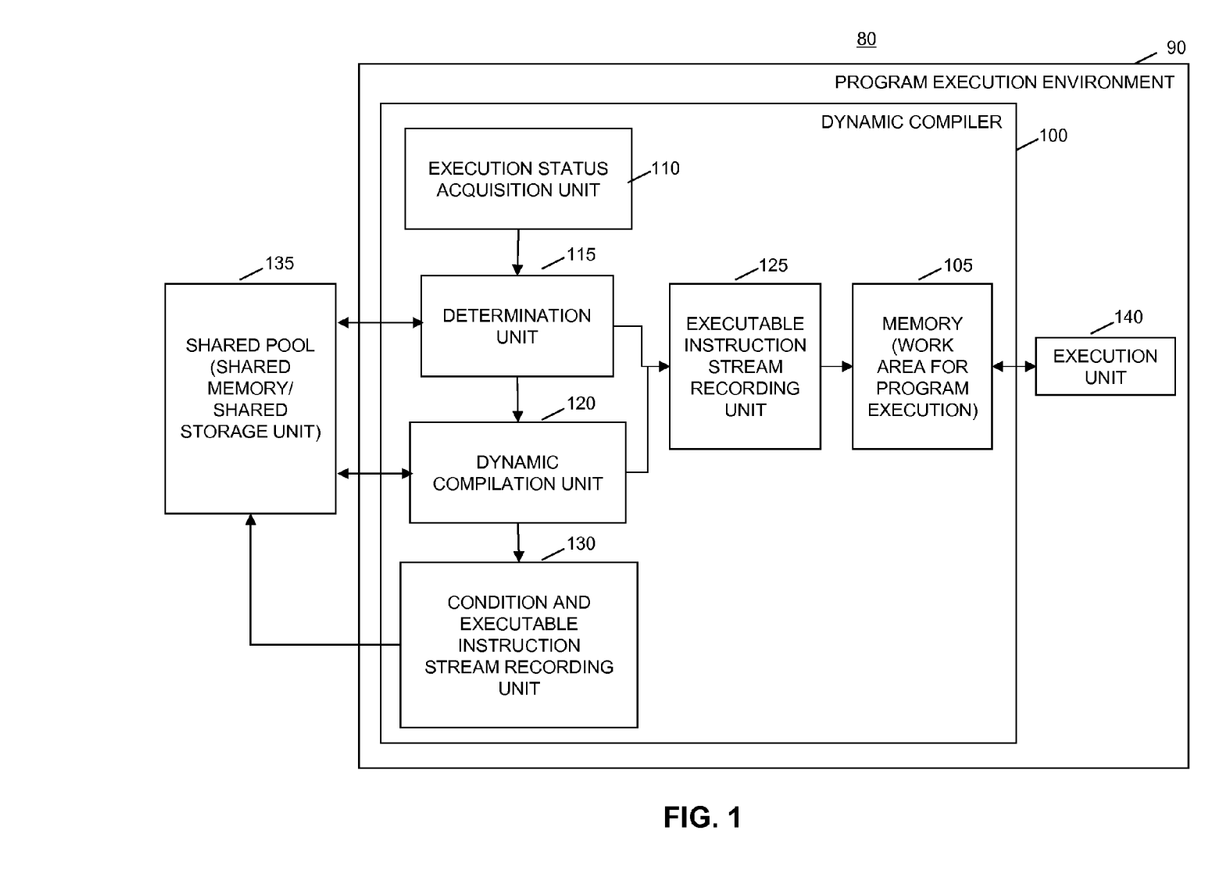
FIG. 1 shows exemplary functional components of a compiler system 80 according to an embodiment of the present invention.

Referring to FIG. 1, the components of a compiler system 80 according to an embodiment of the present invention are shown. The compiler system 80 includes a program execution environment 90 that includes a dynamic compiler 100 causing, during execution of a program, a computer to compile a partial program to be executed, out of a plurality of partial programs included in the program, in a manner that depends on the result of determining whether a corresponding compiled executable instruction stream can be reused and an execution unit 140 executing the program on the computer by executing an executable instruction stream generated or determined as being reused by the dynamic compiler 100. The compiler system 80 further includes a shared pool 135 storing the compiled executable instruction stream to be reused.

In this case, for each of the one or more partial programs of a program to be executed by the computer, the shared pool 135 stores an executable instruction stream generated by compiling the partial program in association with a list of pieces of execution status information that is the status information of an execution environment referred to in each of the one or more types of optimization applied to the partial program and conditions that the respective values of the corresponding pieces of execution status information in the list need to satisfy to achieve the effect of corresponding optimization.

In some adaptive optimization, an executable instruction stream generated by the application of the optimization is made available on the condition that the value of execution status information at the time of use falls within a predetermined range, as described above. Thus, it can be verified at the time of reuse that the value of execution status information at the time of reuse falls within the predetermined range by storing a compiled executable instruction stream in association with a condition that the value of execution status information needs to satisfy to achieve the effects of optimization, the value having been referred to in optimization applied at the time of compilation. The availability of such verification improves the availability of an executable instruction stream generated by the application of adaptive optimization.

Figure 2A:
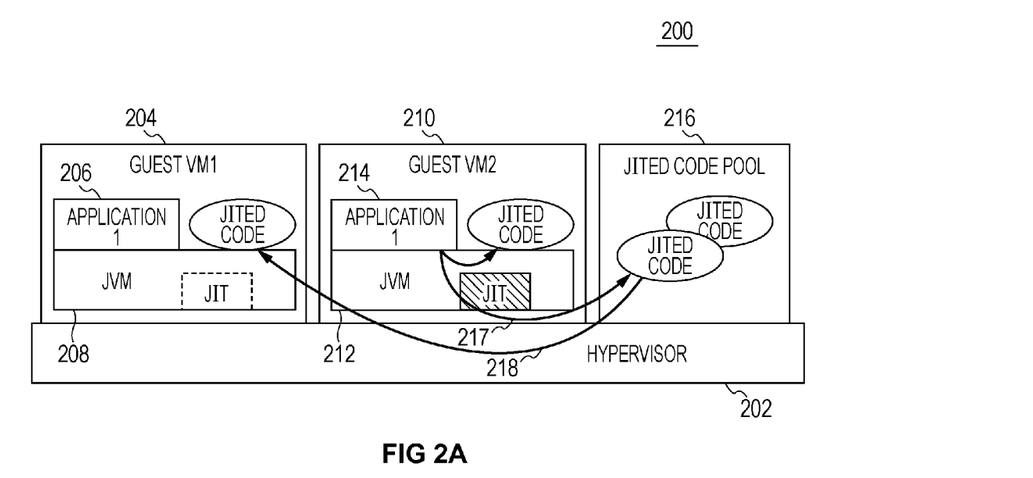
FIG. 2(a) shows an exemplary shared pool according to an embodiment of the present invention.

More specifically, the shared pool 135 can be a part of a memory of a computer or a storage unit such as a hard disk accessible from a computer. In a virtualization environment 200 in which a plurality of different operating systems (OSs) are caused to run in parallel by virtualizing a computer using a control program such as a hypervisor 202, the same application programs 206 and 214 can run respectively on a plurality of virtual machines 208 and 212, as shown in FIG. 2(a). In this case, duplicate compilation can be avoided, and resources such as a processor and a memory used by a dynamic compiler such as a JIT compiler in the plurality of virtual machines 208 and 212 can be effectively used by setting a part of a shared memory of a computer as a shared pool 216 storing compiled executable instruction streams to be reused.

An arrow 217 at the right side in FIG. 2(a) shows that executable instruction streams generated by compiling partial programs included in the application program 214 using a JIT compiler in a guest virtual machine 210 are stored in the shared pool 216. Moreover, an arrow 218 at the left side in the drawing shows that a JIT compiler in a guest virtual machine 204 reads and reuses the executable instruction streams stored in the shared pool 216.

Figure 2B:
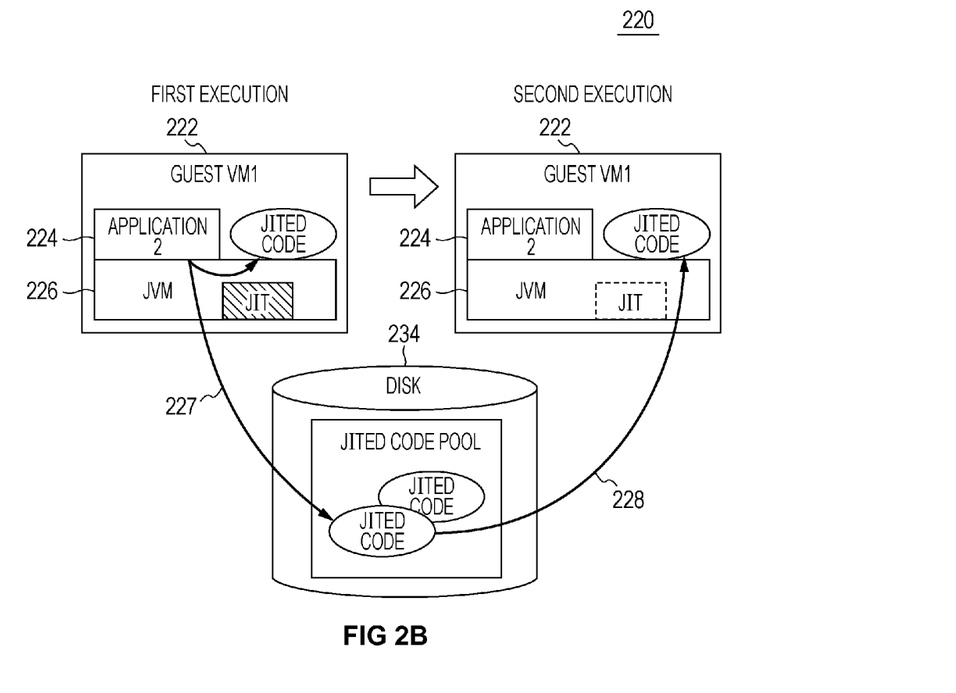
FIG. 2(b) shows another exemplary shared pool according to an embodiment of the present invention.

FIG. 2(b) shows an example in which an accessible storage unit 234 is set as the shared pool 135. In the same machines 222, the same application program 224 is executed multiple times, as shown in the drawing. Thus, when the application program 224 is executed, and partial programs of the application program 224 are compiled, compiled executable instruction streams are stored in the shared pool 135, the storage unit 234 accessible from a computer being set as the shared pool 135, as shown by an arrow 227 at the left side in the drawing. Subsequently, when the same application program 224 is executed, duplicate compilation can be avoided by reusing the executable instruction streams stored in the shared pool, as shown by an arrow 228 at the right side in the drawing.

In this case, a part of a memory or a storage area (hereinafter called a file) in a storage unit used as the shared pool 135 is reserved by the dynamic compiler 100 requesting the allocation to an OS or the hypervisor 202 of the computer via the program execution environment 90 as necessary. Moreover, when a part of a memory is allocated as the shared pool 135, the shared pool 135 is reserved until an OS or the hypervisor 202 is restarted unless a user explicitly deletes the shared pool 135. On the other hand, when a file is allocated as the shared pool 135, the shared pool 135 is reserved until a user explicitly deletes the shared pool 135. In either case, heuristics, for example, automatic deletion of executable instruction streams having been stored for a predetermined time, can be applied, and each executable instruction stream can be deleted.

Whether a part of a memory of a computer or a file is used as the shared pool 135 is determined by a user as the settings of the program execution environment 90 from the viewpoint of, for example, an execution environment, e.g., the presence or absence of the hypervisor 202, a usage scenario in which executable instruction streams are shared among guest virtual machines, as shown in FIG. 2(*a*), or executable instruction streams are reused among multiple executions, as shown in FIG. 2(*b*), and the necessity of permanence of the shared pool 135. In this case, the shared pool 135 can be allocated to both a part of a memory and a file, and the part of the memory or the file can be selectively used in a manner that depends on the conditions of partial programs to be compiled, for example, method names and class names, set in advance by a user or a compiler designer.

Upon receiving an instruction to execute a program that cannot be executed directly by a computer, for example, Java® byte code, the program execution environment 90 executes the program by cooperation between the dynamic compiler 100 and the execution unit 140. When the dynamic compiler 100 determines that a compiled executable instruction stream in the shared pool 135 is available, the execution unit 140 executes the compiled executable instruction stream. More specifically, when the compiled executable instruction stream in the shared pool 135 is copied to a memory 105 by an executable instruction stream recording unit 125 described below in the dynamic compiler 100, the execution unit 140 reads the compiled executable instruction stream from the memory 105 and executes the compiled executable instruction stream.

Alternatively, the execution unit 140 can share and execute a compiled executable instruction stream using a memory map. In this case, for example, when optimization is invalidated or when patching of an executable instruction stream is necessary, e.g., when a reference to, e.g., a class region is set to a constant by address relocation (the details will be described below), a compiled executable instruction stream is copied to the memory 105, and the execution unit 140 reads the compiled executable instruction stream from the memory 105 and executes the compiled executable instruction stream. However, even in this case, when it can be assured that a plurality of the program execution environments 90 such as Java virtual machines do not use the compiled executable instruction stream in the shared pool 135 at the same time, the execution unit 140 can perform execution using the compiled executable instruction stream using a memory map. Such assurance can be implemented using, for example, a busy flag or a lock mechanism.

Moreover, when an executable instruction streams is generated by the dynamic compiler 100, the execution unit 140 executes the generated executable instruction stream. More specifically, when an executable instruction stream generated by a dynamic compilation unit 120 in the dynamic compiler 100 is recorded to the memory 105 by the executable instruction stream recording unit 125 in the dynamic compiler 100, the execution unit 140 reads and executes the executable instruction stream recorded to the memory 105. In this case, the execution unit 140 can execute some partial programs including, for example, the functions of a Java virtual machine using an interpreter.

The dynamic compiler 100 is implemented by executing a dynamic compiler program on a computer and includes the memory 105, an execution status acquisition unit 110, a determination unit 115, the dynamic compilation unit 120, the executable instruction stream recording unit 125, and a condition and executable instruction stream recording unit 130.

The memory 105 is a storage area allocated as a work area for a program to be executed on a memory of a computer executing the dynamic compiler program. Specifically, the memory 105 is, for example, a storage area reserved by the compiler system 80 requesting an OS in a computer to perform memory allocation. The memory 105 can be, for example, a stack area, a heap area, or a storage area allocated by, e.g., the mmap system call of the dynamic compiler 100 and/or the execution unit 140.

The execution status acquisition unit 110 acquires the respective values of one or more pieces of current execution status information that is the status information of an execution environment referred to in optimization of a partial program. The respective values of pieces of execution status information can be acquired by, for example, calling an API provided by the program execution environment 90 such as a Java virtual machine or directly referring to the memory 105.

The determination unit 115 reads, from the shared pool 135, a list of conditions associated with an executable instruction stream generated by compiling a partial program that is the same as a partial program to be compiled and determines whether the respective values of corresponding pieces of current execution status information acquired by the execution status acquisition unit 110 satisfy the conditions in the list. In search of the shared pool 135, for example, when a partial program to be compiled is a method, the class name and method name of the method can be used.

When the value of each piece of current execution status information satisfies a corresponding condition, i.e., a condition that the value of the piece of current execution status information needs to satisfy, the determination unit 115 can read an executable instruction stream associated with the aforementioned list from the shared pool 135 and record the executable instruction stream to the memory 105 functioning as a work area via the executable instruction stream recording unit 125. In this case, when a plurality of conditions exist in the list, the condition for reusing a compiled executable instruction stream is that all the conditions are satisfied by the respective values of corresponding pieces of current execution status information (in a case where a plurality of pieces of execution status information referred to regarding the corresponding conditions exist, the respective values of the plurality of execution status information).

Moreover, when a plurality of executable instruction streams exist in the shared pool 135, the executable instruction streams corresponding to partial programs to be compiled and each being associated with a list of conditions that the respective values of corresponding one or more pieces of current execution status information can satisfy, the determination unit 115 can determine an executable instruction stream with the maximum number of conditions in the list as being an executable instruction stream to be reused. In this case, the determination unit 115 can calculate the number of conditions using weighting values predetermined for each type of optimization that is a basis for imposing the conditions. For example, weights can be set in a manner that depends on the degree of influence of each type of optimization on the execution speed.

Alternatively, when a plurality of executable instruction streams exist in the shared pool 135, the executable instruction streams corresponding to partial programs to be compiled and each being associated with a list of conditions that the respective values of corresponding one or more pieces of current execution status information can satisfy, the determination unit 115 can determine an executable instruction stream, the number of types of optimization applied to the executable instruction stream being largest, as being an executable instruction stream to be reused. In this case, the determination unit 115 can calculate the number of types of optimization using weighting values predetermined for each type of optimization. For example, weights can be set in a manner that depends on the degree of influence of each type of optimization on the execution speed.

When an executable instruction stream does not exist in the shared pool 135, the executable instruction stream corresponding to a partial program to be compiled and being associated with a list of conditions that the respective values of corresponding one or more pieces of current execution status information can satisfy, the determination unit 115 notifies the dynamic compilation unit 120 described below to compile the partial program to be compiled. In this case, the executable instruction stream recording unit 125 records an executable instruction stream generated by the dynamic compilation unit 120 to the memory 105 functioning as a work area.

When the result of the determination by the determination unit 115 is negative, the dynamic compilation unit 120 generates an executable instruction stream by compiling a partial program to be compiled. The dynamic compilation unit 120 preferably compiles a partial program to be compiled by the application of optimization the effect of which is determined as being achieved referring to the respective values of one or more pieces of current execution status information, out of one or more types of optimization applicable to the partial program to be compiled.

More specifically, optimization to be applied is determined in the following manner. A list of candidates for optimization determined by a selected optimization level is first acquired. The optimization level is selected in a manner that depends on, for example, the accumulated times of execution of a partial program to be compiled or the frequency of execution of a partial program to be compiled per unit time. Then, the partial program to be compiled is analyzed to retrieve a code stream to which a type of optimization listed in the candidate list is applicable. Then, the actual effect of the optimization determined as being applicable to the retrieved code stream is estimated on the basis of the respective values of pieces of current execution status information. When the estimated effect is equal to or more than a predetermined magnitude of effect, the optimization is finally applied. Actually, the aforementioned estimation is performed by determining whether the respective values of pieces of current execution status information satisfy corresponding conditions that the respective values of pieces of execution status information need to satisfy so that an estimated effect is equal to or more than a predetermined magnitude of effect. As a result of the estimation, all types of optimization determined as achieving the effect are finally applied.

Such a method for estimating the effect of optimization, the types of one or more pieces of execution status information referred to when estimation is performed, and conditions that the respective values of corresponding pieces of execution status information need to satisfy so that an estimated effect is equal to or more than a predetermined magnitude of effect are determined by the algorithm of optimization and vary with the type of optimization. The algorithm of each type of optimization is a known technique, for example, as shown in Suganuma and is not the subject matter of the present invention. Thus, the detailed description of the algorithm of each type of optimization is omitted here. In the present invention, it is important that a list of pieces of execution status information referred to by the dynamic compilation unit 120 when the application of optimization is considered and a list of conditions, used by the dynamic compilation unit 120, that the respective values of corresponding pieces of execution status information need to satisfy to achieve the effect of optimization are made available when the reuse of a compiled executable instruction stream is considered. Thus, the dynamic compilation unit 120 temporarily stores these pieces of information and transfers the pieces of information to the condition and executable instruction stream recording unit 130 described below.

In the aforementioned temporary storing operation, when the dynamic compilation unit 120 retains conditions that the respective values of corresponding one or more pieces of execution status information need to satisfy to achieve the effect of optimization as data indicating the conditions, the dynamic compilation unit 120 can store the data. Moreover, when the dynamic compilation unit 120 retains the aforementioned conditions as executable codes returning a value of true when the respective values of pieces of execution status information transferred as arguments satisfy the corresponding conditions, the dynamic compilation unit 120 can store the executable codes.

The condition and executable instruction stream recording unit 130 records, to the shared pool 135, an executable instruction stream generated by the dynamic compilation unit 120 in association with a first list of pieces of execution status information referred to in each of the one or more types of optimization applied to a partial program by the dynamic compilation unit 120 and a second list of pieces of information used by the dynamic compilation unit 120 to determine that the effect of optimization is achieved regarding the pieces of execution status information in the first list, i.e., a list of conditions that the respective values of corresponding pieces of execution status information need to satisfy to achieve the effect of applied optimization. In this case, the condition and executable instruction stream recording unit 130 acquires these pieces of information to be recorded to the shared pool 135 directly from the dynamic compilation unit 120 or indirectly via, for example, the memory 105.

When a part of a memory of a computer is used as the shared pool 135, only when all of the one or more types of optimization having been applied refer only to pieces of execution status information the respective values of which only slightly differ from corresponding values in another compiling device that can access the shared pool 135, the condition and executable instruction stream recording unit 130 can record, to the shared pool 135, an executable instruction stream generated by the dynamic compilation unit 120 in association with a first list of pieces of execution status information referred to in the types of optimization and a second list of conditions that the corresponding pieces of execution status information need to satisfy and that have been used to determine that the effect of optimization is achieved regarding the pieces of execution status information in the first list. On the other hand, when a storage unit accessible from a computer is used as the shared pool 135, only when all types of optimization having been applied refer only to pieces of execution status information the respective values of which only slightly change every time the execution status acquisition unit 110 acquires the pieces of execution status information, the condition and executable instruction stream recording unit 130 can record, to the shared pool 135, an executable instruction stream generated by the dynamic compilation unit 120 in association with a first list of pieces of execution status information referred to in the types of optimization and a second list of conditions that the corresponding pieces of execution status information need to satisfy and that have been used to determine that the effect of optimization is achieved regarding the pieces of execution status information in the first list.

It is assumed that information on the types of execution status information having the aforementioned characteristics is set in a computer in advance so that the condition and executable instruction stream recording unit 130 can refer to the information. Alternatively, since many pieces of execution status information referred to when a low optimization level is applied have such characteristics, only when all of the one or more types of optimization having been applied are low-level optimization, the condition and executable instruction stream recording unit 130 can record, to the shared pool 135, an executable instruction stream generated by the dynamic compilation unit 120 in association with a first list of pieces of execution status information referred to in the types of optimization and a second list of conditions that the corresponding pieces of execution status information need to satisfy and that have been used to determine that the effect of optimization is achieved regarding the pieces of execution status information in the first list. In this case, in addition, the dynamic compilation unit 120 transfers information on the applied optimization level to the condition and executable instruction stream recording unit 130. Adoption of the aforementioned arrangement further increases the reusability of an executable instruction stream compiled by the application of adaptive optimization.

FIG. 3 is a list showing specific exemplary pieces of execution status information referred to when the application of adaptive optimization is considered and specific exemplary conditions that the corresponding pieces of execution status information need to satisfy to achieve the effect of optimization to be applied. The pieces of execution status information acquired by the execution status acquisition unit 110 and referred to by the dynamic compilation unit 120 to determine whether to apply adaptive optimization can be classified into (1) partial program (method) to be compiled, (2) configuration information of computer (system) in which the program execution environment 90 is created, (3) internal information of virtual machine, and (4) profile information at the time a program is executed, as shown in FIG. 3.

The specific exemplary pieces of execution status information classified into (1) to (4) are as shown in FIG. 3. These pieces of execution status information are read from a Java® class file by the execution unit 140 when execution of a program is started or is newly generated after a program is executed to be stored in the memory 105. Shaded pieces of execution status information, out of the pieces of execution status information shown in the list in FIG. 3, include pieces of execution status information the respective values of which only slightly differ from corresponding values in another compiling device that can access the shared pool 135 and pieces of execution status information the respective values of which only slightly change every time the execution status acquisition unit 110 acquires the pieces of execution status information described above.

Each of the specific exemplary conditions that corresponding pieces of execution status information need to satisfy in the list in FIG. 3 will now be described. In a condition 1, pieces of execution status information are a time a class file was changed (execution status information 1) and a time an executable instruction stream stored in the memory 105 was created (execution status information 2). The condition 1 can be expressed as a logical expression returning a value of true when the value of the execution status information 1 is equal to or less than the value of the execution status information 2. In a condition 2, execution status information is a list of methods that can be inlined (execution status information 1). The conditions 2 can be expressed as a logical expression returning a value of true when the execution status information 1 includes both C1.foo( ) and C2.bar( ).

In a condition 3, execution status information is the number of CPUs in a machine (execution status information 1). Thus, the condition 3 can be expressed as a logical expression returning a value of true when the value of the execution status information 1 is equal to or more than two. In a condition 4, execution status information is the version of a Java virtual machine (execution status information 1). Thus, the condition 4 can be expressed as a logical expression returning a value of true when the value of the execution status information 1 is equal to "Java 6".

In a condition 5, execution status information is a command line argument (execution status information 1). Thus, the condition 5 can be expressed as a logical expression returning a value of true when the value of the execution status information 1 includes –Xaggressive. In a condition 6, execution status information is a list of classes having been initialized (execution status information 1). Thus, the condition 6 can be expressed as a logical expression returning a value of true when the value of the execution status information 1 includes java.util.ArrayList.

In a condition 7, execution status information is the address of an executable instruction stream of another method (execution status information 1). Thus, the condition 7 can be expressed as a logical expression returning a value of true when the value of the execution status information 1 is within 32 KB from a generated address of a method that is currently being compiled. In a condition 8, execution status information is information stored in the memory 105 regarding another method called from a method that is being compiled (execution status information 1). Thus, the condition 8 can be expressed as a logical expression returning a value of true when the value of the execution status information 1 does not include information showing that a value received as an argument is stored into a global variable.

In a condition 9, execution status information is the class hierarchy information of loaded classes (execution status information 1). Thus, the condition 9 can be expressed as a logical expression returning a value of true when the value of the execution status information 1 does not include information showing that a method foo( ) in a class C is overridden with a subclass. In a condition 10, execution status information is the status of resolution of external reference to a class C referred to from a method that is being compiled (execution status information 1). Thus, the condition 10 can be expressed as a logical expression returning a value of true when the value of the execution status information 1 is equal to information showing "resolved".

In a condition 11, execution status information is the result of an execution profile (execution status information 1). Thus, the condition 11 can be expressed as a logical expression returning a value of true when the value of the execution status information 1 includes a value equal to or more than 75% as information showing the probability that the value of an argument of a method foo( ) is zero. In a condition 12, execution status information is information on the optimization level (execution status information 1). Thus, the condition 12 can be expressed as a logical expression returning a value of true when the value of the execution status information 1 is equal to "warm".

Conditions that corresponding pieces of execution status information need to satisfy to achieve the effect of optimization to be applied can be stored in a form that can be processed by a computer, as described above.

When an executable instruction stream generated by the dynamic compilation unit 120 includes an address as an operand, the condition and executable instruction stream recording unit 130 records, to the shared pool 135, the executable instruction stream in association with, in addition, relocation information. In this case, relocation information is information for correcting the aforementioned address when the executable instruction stream is reused. Specifically, relocation information includes the information of the location of the address in the executable instruction stream (more specifically, the location of the address value in the executable instruction stream and the byte length) and identification information for identifying data pointed to by the address.

For example, it is assumed that "four bytes from an offset of eighty bytes" as the information of the location of an address in an executable instruction stream and relocation information including "a structure retaining the content of the java.lang.String class" as identification information for identifying data pointed to by the address are associated with an executable instruction stream in the shared pool 135. In this case, when it is determined that the executable instruction stream is reused, the dynamic compiler 100 acquires the address (32 bits=4 bytes) of the structure retaining the content of the java.lang.String class in the current program execution environment 90, copies the executable instruction stream to be reused from the shared pool 135 to the memory 105, and overwrites the four bytes from the offset of eighty bytes with the acquired address.

Figure 4:
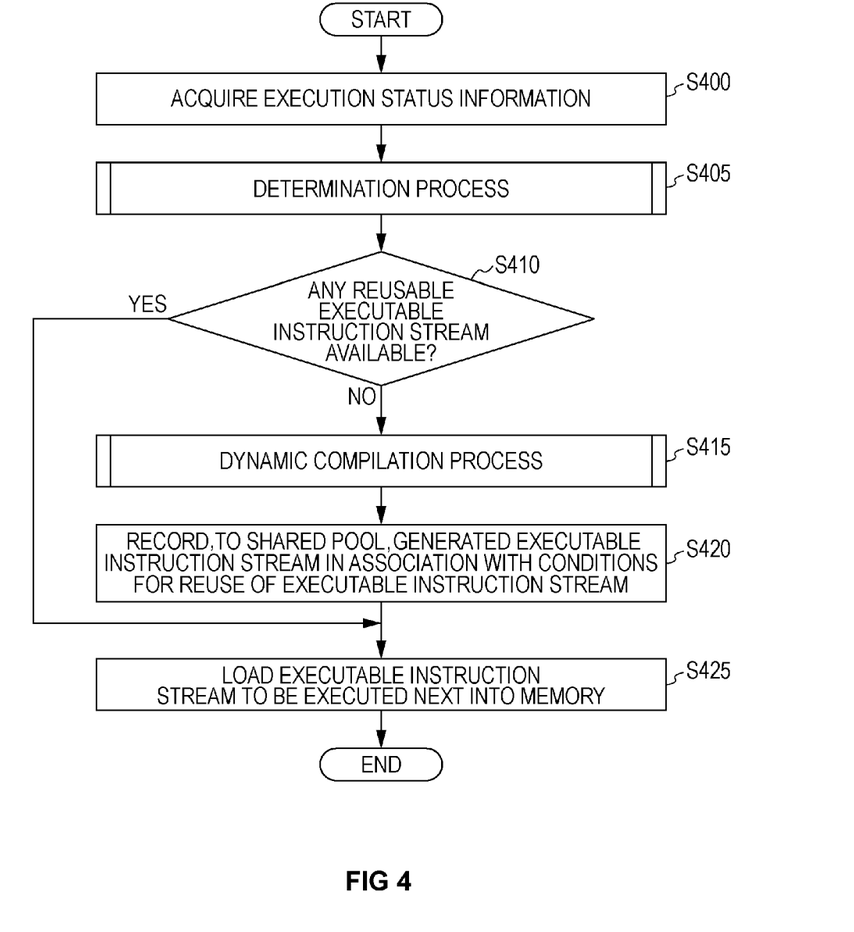
FIG. 4 shows an exemplary operational flow of a dynamic compiler 100 according to an embodiment of the present invention.

The operations of the dynamic compiler 100 will next be described referring to FIGS. 4 to 6. FIG. 4 shows an exemplary operational flow of the dynamic compiler 100 according to the embodiment. The dynamic compiler 100 sequentially compiles a partial program to be executed next, out of a plurality of partial programs included in a program. The operational flow shown in FIG. 4 starts from a state in which the dynamic compiler 100 has received a request to compile a partial program to be executed next from the execution unit 140.

The process starts from step 400 where the execution status acquisition unit 110 acquires the respective values of one or more pieces of current execution status information by, for example, calling an API provided by the program execution environment 90 such as a Java virtual machine or directly referring to the memory 105.

Then, the determination unit 115 determines, on the basis of the respective values of the one or more pieces of current execution status information received from the execution status acquisition unit 110, whether a reusable executable instruction stream corresponding to the partial program to be compiled is available in the shared pool 135 (step 405). The details of the determination process will be described below referring to FIG. 5.

Then, the determination unit 115 determines whether a reusable executable instruction stream has been found in the determination process (step 410). When a reusable executable instruction stream has not been found in the shared pool 135 (step 410: No), the determination unit 115 notifies the dynamic compilation unit 120 of the result, and the dynamic compilation unit 120 compiles the partial program to be executed next (step 415). The details of the dynamic compilation process will be described below referring to FIG. 6.

Then, the condition and executable instruction stream recording unit 130 records, to the shared pool 135, an executable instruction stream generated by the dynamic compilation unit 120 by compiling the partial program in association with a first list of the pieces of execution status information referred to in each of the one or more types of optimization applied to the partial program and a second list of conditions that the respective values of the corresponding pieces of execution status information need to satisfy, the conditions having been used by the dynamic compilation unit 120 to determine that the effect of optimization is achieved regarding the pieces of execution status information in the first list (step 420).

When a reusable executable instruction stream has been found in the determination process (step 410: Yes), or from step 420, the process proceeds to step 425 where the executable instruction stream recording unit 125 loads, into the memory 105, the executable instruction stream generated by the dynamic compilation unit 120 or the executable instruction stream determined by the determination unit 115 as being to be reused in the shared pool 135. Then, the process is completed.

Figure 5A:
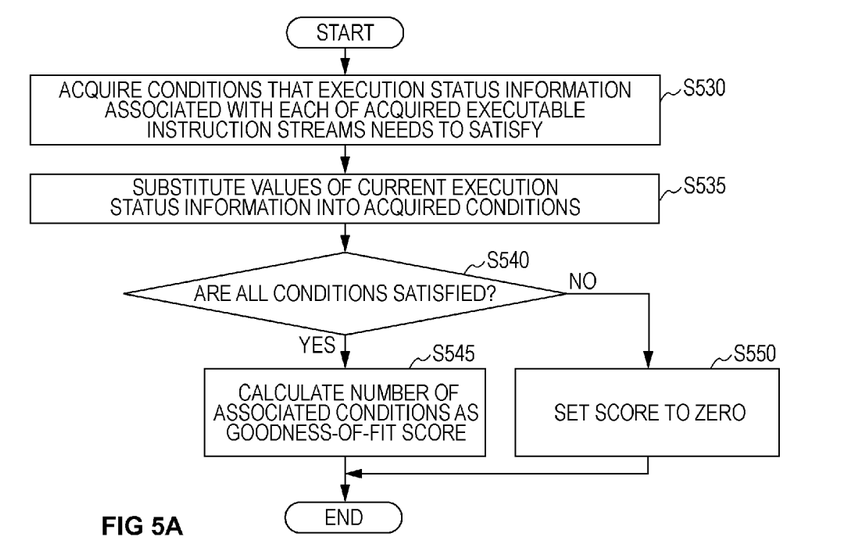
FIG. 5(a) shows an exemplary detailed operational flow of a determination process performed by the dynamic compiler 100 according to an embodiment of the present invention.

FIG. 5(a) shows an exemplary detailed operational flow of the determination process in step 405 shown in FIG. 4. The process starts from step 500 where the determination unit 115 reads all executable instruction streams corresponding to a next partial program to be compiled from the shared pool 135. Then, the determination unit 115 calculates a score indicating the goodness of fit of each of the acquired executable instruction streams to the current execution environment (step 505). The details of the score calculation process will be described below referring to FIG. 5(b). Then, the determination unit 115 determines whether an executable instruction stream with a goodness-of-fit score exceeding zero, the goodness-of-fit score having been calculated in step 505, exists (step 510).

When an executable instruction stream with a calculated score exceeding zero exists (step 510: Yes), the determination unit 115 selects an executable instruction stream with the maximum score as an executable instruction stream to be reused (step 515). On the other hand, when an executable instruction stream with a calculated score exceeding zero does not exist (step 510: No), the determination unit 115 determines that no reusable executable instruction stream is available (step 520). After steps 515 and 520, the process is completed.

Figure 5B:
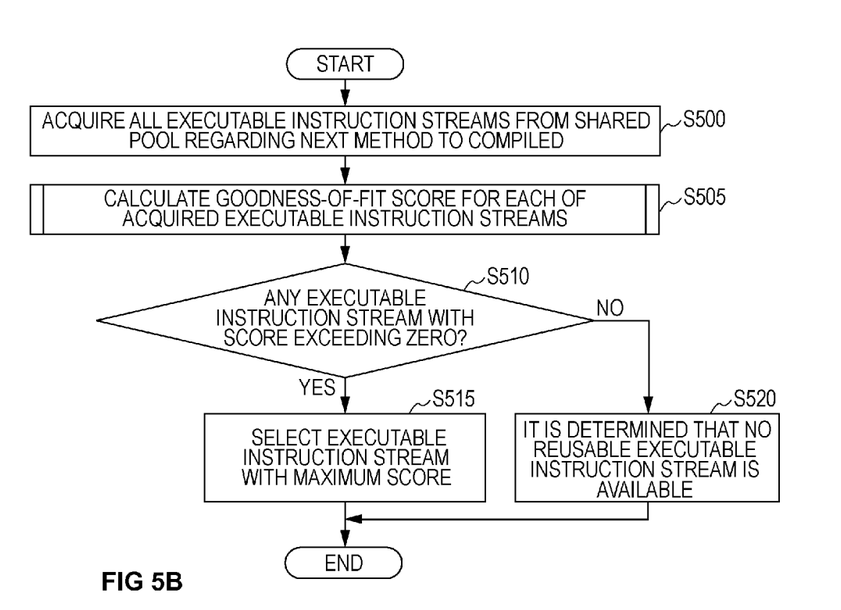
FIG. 5(b) shows an exemplary detailed operational flow of a score calculation process performed by the dynamic compiler 100 according to an embodiment of the present invention.

FIG. 5(b) shows an exemplary detailed operational flow of the score calculation process in step 505 shown in FIG. 5(a). The process starts from step 530 where the determination unit 115 acquires a list of conditions associated with each of the read executable instruction streams. Then, the determination unit 115 substitutes the respective values of corresponding pieces of current execution status information acquired by the execution status acquisition unit 110 into the one or more conditions in the list acquired for the executable instruction stream (step 535) and determines whether all the conditions in the list are satisfied by the respective values of corresponding pieces of current execution status information (step 540).

When one or more executable instruction streams for which all the conditions in the list are satisfied exist (step 540: Yes), regarding the one or more executable instruction streams, the process proceeds to step 545. Then, for each of the one or more executable instruction streams, the determination unit 115 calculates the number of conditions in the list associated with the executable instruction stream as a score indicating the goodness of fit of the executable instruction stream to the current execution environment. On the other hand, when one or more executable instruction streams for which some or all of the conditions in the list are not satisfied exist (step 540: No), regarding the one or more executable instruction streams, the process proceeds to step 550. Then, for each of the one or more executable instruction streams, the determination unit 115 sets a score indicating the goodness of fit of the executable instruction stream to the current execution environment to zero. Then, the process is completed.

Figure 6:
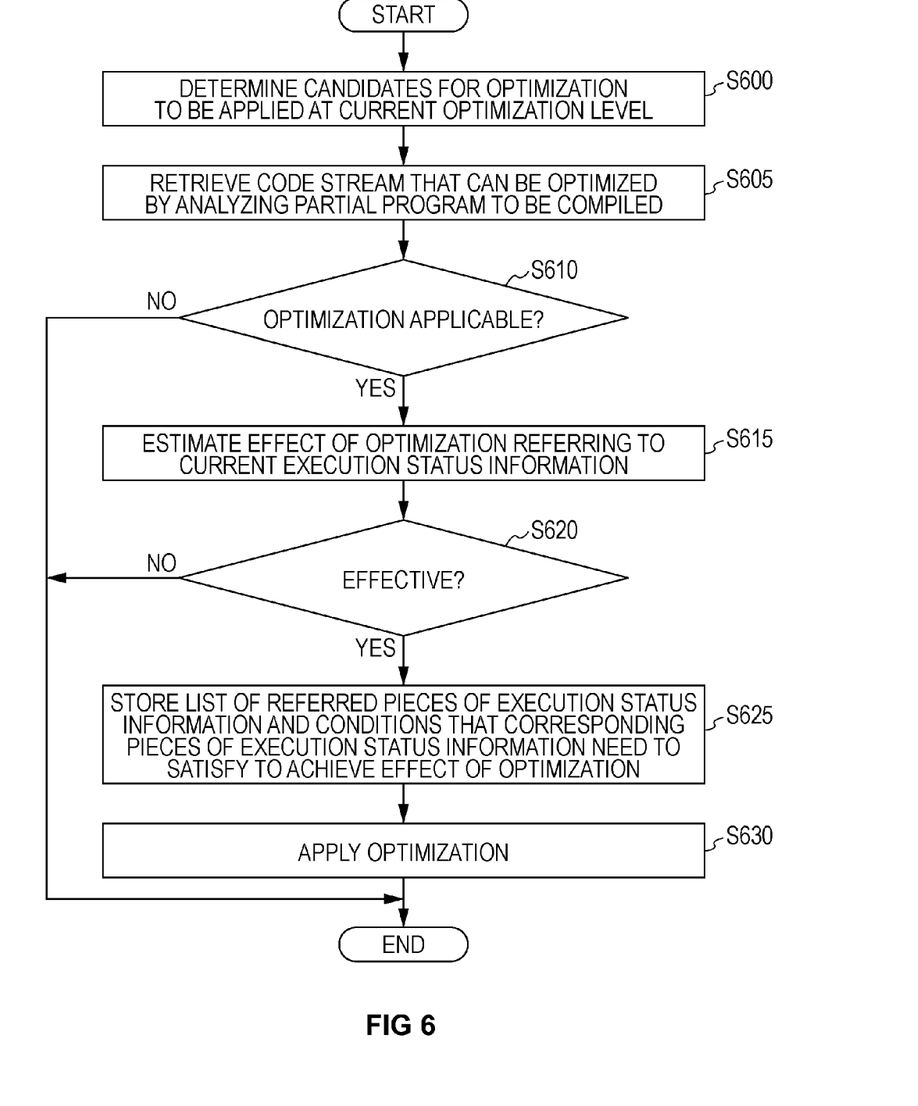
FIG. 6 shows an exemplary detailed operational flow of a dynamic compilation process performed by the dynamic compiler 100 according to an embodiment of the present invention.

FIG. 6 shows an exemplary detailed operational flow of the dynamic compilation process in step 415 shown in FIG. 4. The process starts from step 600 where the dynamic compilation unit 120 determines candidates for optimization to be applied determined by the current optimization level. Then, the dynamic compilation unit 120 retrieves a code stream to which a candidate for optimization is applicable by analyzing a partial program to be compiled (step 605).

Then, the dynamic compilation unit 120 determines whether a code stream that can be optimized exists (step 610). When a code stream that can be optimized does not exist (step 610: No), the process is completed. On the other hand, when a code stream that can be optimized exists (step 610: Yes), the process proceeds to step 615 where the dynamic compilation unit 120 estimates the effect of optimization referring to one or more pieces of current execution status information acquired by the execution status acquisition unit 110. Specifically, the estimation of the effect of optimization is performed by determining, regarding optimization applicable to the code stream found in step 605, whether one or more conditions that corresponding pieces of execution status information need to satisfy to achieve the effect of the optimization are satisfied by the respective values of corresponding one or more pieces of current execution status information.

Then, the dynamic compilation unit 120 determines whether the result of the estimation in step 615 shows that the effect of the optimization can be achieved (step 620). When the dynamic compilation unit 120 determines that the effect of the optimization can be achieved (step 620: Yes), the dynamic compilation unit 120 temporarily stores a list of pieces of execution status information referred to in considering the application of the optimization and a list of conditions that the corresponding pieces of execution status information need to satisfy to achieve the effect of the optimization so as to transfer the lists to the condition and executable instruction stream recording unit 130 (step 625).

Then, the dynamic compilation unit 120 compiles the code stream, to which the optimization is applicable and for which it is determined, on the basis of the pieces of current execution status information, that the effect of the optimization can be achieved, by the application of the optimization (step 630). Then, the process is completed. In this case, it should be noted that steps 610 to 630 are performed for each code stream that can be optimized and has been retrieved in step 605.

Figure 7:
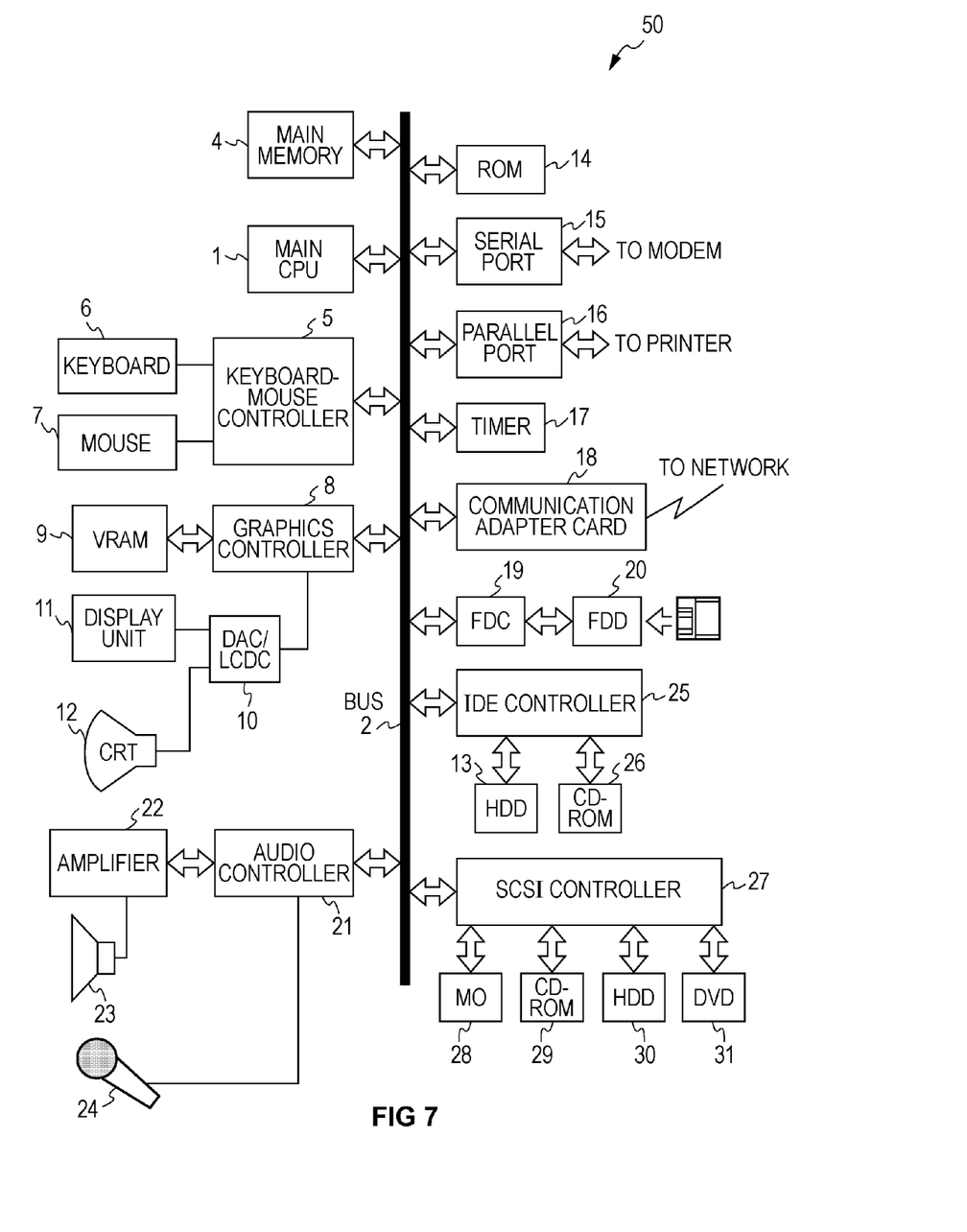
FIG. 7 shows exemplary hardware components of a computer 50 according to an embodiment of the present invention.

FIG. 7 is a diagram showing exemplary hardware components of a computer 50 according to the embodiment. The computer 50 includes a main CPU (central processing unit) 1 and a main memory 4 connected to a bus 2. Hard disk units 13 and 30 and removable storages (external storage systems in which a recording medium can be changed) such as CD-ROM units 26 and 29, a flexible disk unit 20, an MO unit 28, and a DVD unit 31 are connected to the bus 2 via a flexible disk controller 19, an IDE controller 25, and an SCSI controller 27.

Storage media such as a flexible disk, an MO, a CD-ROM, and a DVD-ROM are inserted into the removable storages. The code of a computer program for carrying out the present invention by issuing instructions to the CPU 1 and the like, cooperating with an operating system, can be recorded in, for example, these storage media, the hard disk units 13 and 30, and a ROM 14. That is, a compiler program that is installed in the computer 50 and causes the computer 50 to function as the compiler system 80 can be recorded in the various types of storage units described above.

The compiler program includes a dynamic compiler program and an execution module. The programs and the module cause the CPU 1 and the like to cause the computer 50 to function as the dynamic compiler 100 and the execution unit 140. The dynamic compiler program includes an execution status acquisition module, a determination module, a dynamic compilation module, an executable instruction stream recording module, and a condition and executable instruction stream recording module. These modules cause the CPU 1 and the like to cause the computer 50 to function as the execution status acquisition unit 110, the determination unit 115, the dynamic compilation unit 120, the executable instruction stream recording unit 125, and the condition and executable instruction stream recording unit 130. The computer program can be compressed and divided into a plurality of pieces to be recorded in a plurality of media.

The computer 50 receives input from input devices such as a keyboard 6 and a mouse 7 via a keyboard-mouse controller 5. The computer 50 receives input from a microphone 24 and outputs sounds from a speaker 23 via an audio controller 21. The computer 50 is connected to a display unit 11 for presenting visual data to users via a graphics controller 8. The computer 50 can be connected to a network via, for example, a communication adapter card 18 (for example, an Ethernet® card or a token ring card) and can communicate with another computer and the like.

It will be appreciated from the foregoing description that the computer 50 according to the embodiment can be implemented via general information processors, such as a personal computer, a workstation, and a mainframe, or the combination of them. The aforementioned components are illustrative, and all the components are not essential components of the present invention.

While the present invention has been described using the embodiment, the technical scope of the present invention is not limited to the description of the aforementioned embodiment. It is obvious to persons skilled in the art that various changes or improvements can be made in the aforementioned embodiment. Thus, the embodiment, in which such changes or improvements are made, is also covered by the technical scope of the present invention.

It should be noted that, regarding the execution sequence of processes, for example, operations, procedures, steps, and stages, in the devices, the systems, the programs, and the methods described in the claims, the description, and the drawings, expressions such as "before" and "preceding" are not explicitly given, and the devices, the systems, the programs, and the methods can be implemented with a sequence of processes unless the output of a preceding process is used by a following process. Moreover, it should be noted that, even when the output of a preceding process is used by a following process, another process can intervene between the preceding process and the following process, or even when a statement that another process intervenes between a preceding process and a following process is given, a change such that the preceding process is performed just before the following process can be made. Even when operational flows in the claims, the description, and the drawings are described using expressions such as "first", "next", and "subsequently" for convenience, this does not necessarily mean that such a sequence is required.

What is claimed is:

1. A dynamic compiler program product stored on a non-transitory storage medium for causing a computer to sequentially compile a partial computer program to be executed, out of a plurality of partial programs included in a computer program, during execution of the program, wherein the computer comprises: (i) a shared pool for storing, in each of one or more partial programs in the program executed by the computer; and (ii) an executable instruction stream generated by compiling the partial program in association with a first list of pieces of execution status information, wherein the status information is of an execution environment referred to in each of one or more types of optimization applied to the partial program and a second list of conditions that respective values of the corresponding pieces of execution status information in the first list need to satisfy to achieve an effect of corresponding optimization, and wherein the dynamic compiler program product causes the computer to function as:
an execution status acquisition unit for acquiring respective values of one or more pieces of current execution status information;
a determination unit for reading, from the shared pool, the second list of the conditions associated with an executable instruction stream generated by compiling a partial program that is the same as a partial program to be compiled and determining whether respective values of corresponding pieces of current execution status information satisfy the conditions; and
a dynamic compilation unit for generating an executable instruction stream by compiling the partial program to be compiled on the condition that a result of determination made by the determination unit is negative,
wherein the dynamic compiler program product causes the computer to reuse the executable instruction stream stored in the shared pool in association with the second list of the conditions on the condition that the determination made by the determination unit is positive.

2. The dynamic compiler program product according to claim 1, wherein:
the dynamic compilation unit generates an executable instruction stream by compiling the partial program to be compiled by optimizing, an effect of which is determined as being achieved by referring to the respective values of the one or more pieces of current execution status information, using the one or more types of optimization applicable to the partial program to be compiled, and
the dynamic compiler program product further causes the computer to function as a condition and an executable instruction stream recording unit recording, to the shared pool, the executable instruction stream generated by the dynamic compilation unit in association with the first list and the second list used to determine that an effect of corresponding optimization is achieved regarding the pieces of execution status information in the first list.

3. The dynamic compiler program product according to claim 2, wherein the shared pool is a part of a memory of the computer, and only on the condition that all of the one or more types of optimization applied to the partial program refer only to the pieces of execution status information respective values of which only slightly differ from corresponding values in another compiling device that can access the shared pool, the condition and the executable instruction stream recording unit records, to the shared pool, the executable instruction stream generated by the dynamic compilation unit in association with the first list and the second list used to determine that the effect of the corresponding optimization is achieved regarding the pieces of execution status information in the first list.

4. The dynamic compiler program product according to claim 2, further causing the computer to function as an executable instruction stream recording unit for (i) reading, from the shared pool, the executable instruction stream in association with the second list of the conditions and (ii) recording the executable instruction stream to a storage area allocated as a work area for the program on a memory of the computer on the condition that the result of the determination made by the determination unit is positive and recording, to the storage area, the executable instruction stream generated by the dynamic compilation unit on the condition that the result of the determination made by the determination unit is negative.

5. The dynamic compiler program product according to claim 2, wherein, in a case where a plurality of executable instruction streams exist in the shared pool, wherein the executable instruction streams correspond to the partial program to be compiled and each being associated with the second list, the determination unit determines an executable instruction stream with a maximum number of conditions in the second list of the conditions as being the executable instruction stream to be reused.

6. The dynamic compiler program product according to claim 5, wherein the number of conditions is calculated using weighting values predetermined for each of the types of optimization.

7. The dynamic compiler program product according to claim 2, wherein, in a case where a plurality of executable instruction streams exist in the shared pool, wherein the executable instruction streams correspond to the partial program to be compiled and each being associated with the second list, the determination unit determines an executable instruction stream, wherein a number of types of optimization applied to the executable instruction stream is the largest and the executable instruction stream is to be reused.

8. The dynamic compiler program product according to claim 7, wherein the number of types of optimization is calculated using weighting values predetermined for each type of optimization.

9. The dynamic compiler program product according to claim 2, wherein, in a case where the executable instruction stream generated by the dynamic compilation unit includes an address as an operand, the condition and executable instruction stream recording unit records, to the shared pool, the executable instruction stream in association with information of a location of the address in the executable instruction stream and identification information for identifying data pointed to by the address.

10. The dynamic compiler program product according to claim 2, wherein the shared pool is a storage unit accessible from the computer, and only on the condition that all of the one or more types of optimization applied to the partial program refer only to the pieces of execution status information respective values of which only slightly change every time the execution status acquisition unit acquires the pieces of execution status information, the condition and the executable instruction stream recording unit records, to the shared pool, the executable instruction stream generated by the dynamic compilation unit in association with the first list and the second list used to determine that the effect of the corresponding optimization is achieved regarding the pieces of execution status information in the first list.

11. A dynamic compiling device for sequentially compiling a partial computer program to be executed, out of a plurality of partial programs included in a computer program, during execution of the program, the dynamic compiling device comprising: a hardware computer;
- a shared pool for storing, in each of one or more partial computer programs in a computer program executed by the computer, an executable instruction stream generated by compiling the partial program in association with a first list of pieces of execution status information, wherein the status information is of an execution environment referred to in each of one or more types of optimization applied to the partial program and a second list of conditions that respective values of the corresponding pieces of execution status information in the first list need to satisfy to achieve an effect of corresponding optimization;
- an execution status acquisition unit for acquiring respective values of one or more pieces of current execution status information;
- a determination unit for reading, from the shared pool, the second list of the conditions associated with an executable instruction stream generated by compiling a partial program that is the same as a partial program to be compiled and determining whether respective values of corresponding pieces of current execution status information satisfy the conditions; and
- a dynamic compilation unit for generating an executable instruction stream by compiling the partial program to be compiled on the condition that a result of the determination is negative,
- wherein the executable instruction stream stored in the shared pool in association with the second list of the conditions is reused on the condition that the determination is positive.

12. The dynamic compiling device according to claim 11, wherein:
- the dynamic compilation unit compiles the partial program to be compiled by optimizing, an effect of which is determined as being achieved by referring to the respective values of the one or more pieces of current execution status information, by using the one or more types of optimization applicable to the partial program to be compiled, and
- the dynamic compiling device further comprises a condition and an executable instruction stream recording unit for recording, to the shared pool, only on the condition that all of the one or more types of optimization applied to the partial program are low-level optimization types, the generated executable instruction stream in association with the first list and the second list used to determine that an effect of optimization is achieved regarding the pieces of execution status information in the first list.

* * * * *